(12) United States Patent
Gnepf et al.

(10) Patent No.: US 7,325,320 B2
(45) Date of Patent: Feb. 5, 2008

(54) METHOD FOR ESTIMATING THE ACCURACY OF AZIMUTHAL ORIENTATIONS AND PORTABLE SIGHTING DEVICE

(75) Inventors: Silvio Gnepf, Heerbrugg (CH); Jürg Gees, Heerbrugg (CH)

(73) Assignee: Vectronix AG, Heerbrugg (CH)

( * ) Notice: Subject to any disclaimer, the term of this patent is extended or adjusted under 35 U.S.C. 154(b) by 54 days.

(21) Appl. No.: 11/108,133

(22) Filed: Apr. 15, 2005

(65) Prior Publication Data

US 2005/0229411 A1    Oct. 20, 2005

(30) Foreign Application Priority Data

Apr. 17, 2004    (CH) ...................................... 0677/04

(51) Int. Cl.
*G01C 17/38* (2006.01)

(52) U.S. Cl. .................... 33/356; 33/355 R; 702/92

(58) Field of Classification Search .................. 33/356, 33/357, 355 R, 276; 702/5, 85, 92, 93, 94
See application file for complete search history.

(56) References Cited

U.S. PATENT DOCUMENTS

| | | | | |
|---|---|---|---|---|
| 4,295,201 A * | 10/1981 | Wiklund | ...................... | 702/158 |
| 4,949,089 A * | 8/1990 | Ruszkowski, Jr. | ............ | 342/52 |
| 5,266,958 A * | 11/1993 | Durboraw, III | ........ | 342/357.08 |
| 5,528,518 A * | 6/1996 | Bradshaw et al. | ........... | 702/150 |
| 5,929,807 A * | 7/1999 | Viney et al. | ............ | 342/357.06 |
| 6,009,629 A * | 1/2000 | Gnepf et al. | ................... | 33/357 |
| 6,094,625 A * | 7/2000 | Ralston | ....................... | 702/150 |
| 6,336,081 B1 * | 1/2002 | Gnepf et al. | ................. | 702/150 |
| 6,466,871 B1 * | 10/2002 | Reisman et al. | ............ | 701/224 |
| 6,539,639 B2 * | 4/2003 | Smith | ......................... | 33/356 |
| 6,543,146 B2 * | 4/2003 | Smith et al. | .................... | 33/356 |
| 6,633,256 B2 * | 10/2003 | Zhdanov et al. | ........ | 342/357.17 |
| 7,024,782 B1 * | 4/2006 | Bork | .......................... | 33/355 R |
| 7,086,164 B2 * | 8/2006 | Satoh et al. | ................... | 33/316 |
| 7,200,948 B2 * | 4/2007 | Lee et al. | ...................... | 33/356 |
| 7,210,235 B2 * | 5/2007 | Sato | .......................... | 33/355 R |
| 7,210,236 B2 * | 5/2007 | Sato et al. | ..................... | 33/356 |
| 7,237,343 B2 * | 7/2007 | Sato et al. | ..................... | 33/356 |
| 2007/0033818 A1 * | 2/2007 | Kitamura et al. | ......... | 33/355 R |

* cited by examiner

*Primary Examiner*—G. Bradley Bennett
*Assistant Examiner*—Amy R. Cohen
(74) *Attorney, Agent, or Firm*—John K. McCulloch

(57) ABSTRACT

In a method according to the invention for estimating the accuracy of azimuthal orientations (a) of a measuring device (1) having an electronic magnetic compass (2), a plurality of determinations of an azimuthal orientation (a, a', a'', a''', a'''') are carried out, in which the measuring device is aligned with one and the same measuring points at different measuring locations (P, P', P'', P''', P'''') adjacent to one another. On the basis of these determined azimuthal orientations (a, a', a'', a''', a''''), the value of the accuracy is automatically estimated by the measuring device (1) by means of a computational method. The adjacent measuring locations (P, P', P'', P''') are advantageously located one above the other or along a straight line to the measuring point. By means of this method, stationary stray fields of local scale can be detected and the effects thereof on the accuracy can be estimated. Further methods according to the invention are designed in each case specifically for further types of stray fields.

19 Claims, 2 Drawing Sheets

Figure 4:
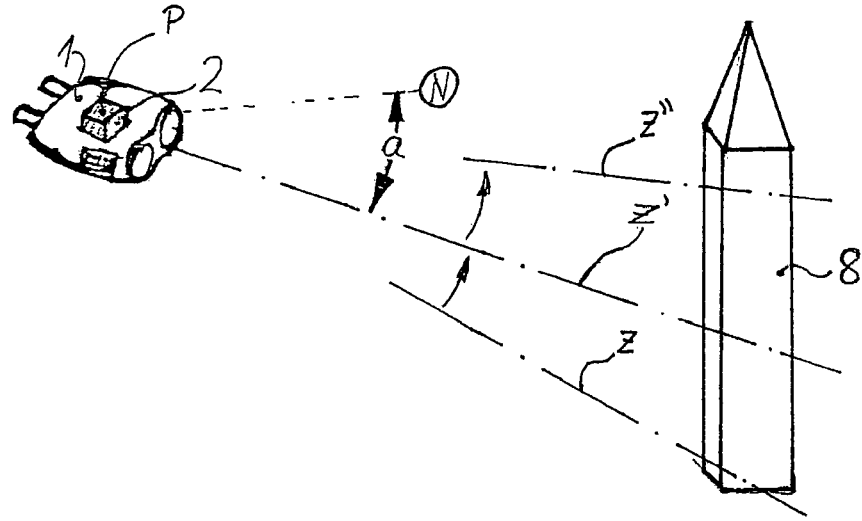

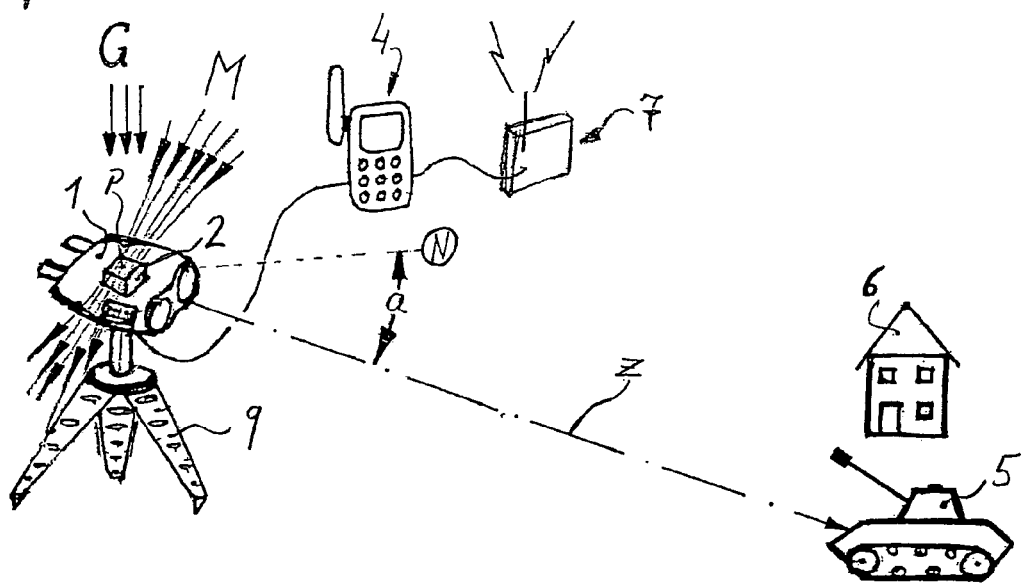
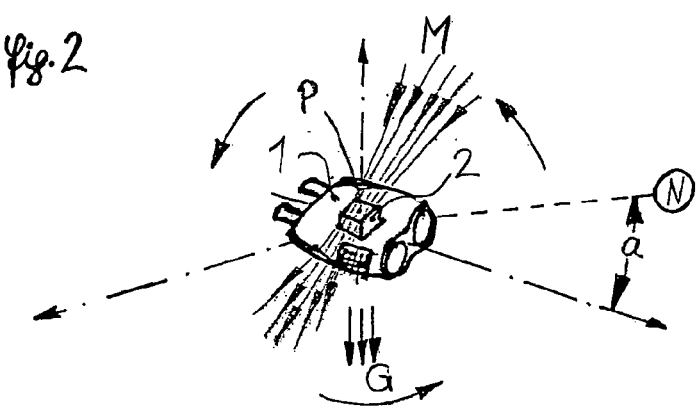
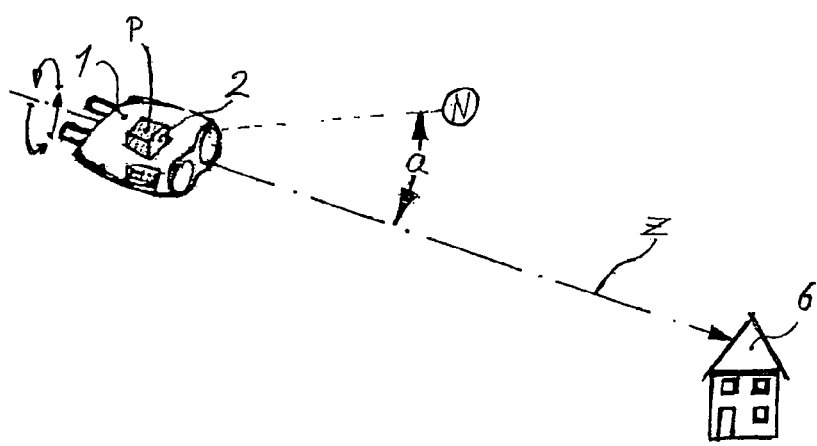

METHOD FOR ESTIMATING THE ACCURACY OF AZIMUTHAL ORIENTATIONS AND PORTABLE SIGHTING DEVICE

The invention relates to a method for estimating the accuracy of azimuthal orientations of a measuring device comprising a magnetic compass relative to the geographic north, and a portable sighting device.

Such measuring devices are used for determining coordinates of distant objects, for example in object recording and data collection for geographic information systems (GIS). Such measuring devices may also be in the form of portable sighting devices which are used in particular for determinations of coordinates of military target objects. Such a determination of target coordinates requires the relative coordinates between the measuring device and the target object. For this purpose, the sighting device is aligned with the target object, and the azimuthal orientation and the zenith orientation of the sighting device relative to earth are then determined. The angle values determined can then be provided, together with a typical accuracy value in each case, at a data interface of the sighting device for transmission to a firing control post. From the firing control post, the firing activity can then be introduced via a firing unit into an area coordinated with the transmitted target coordinates.

With regard to the achievable accuracy of the target coordinates to be determined, the magnetic compass is the critical component. On the basis of the transmitted accuracy value of the azimuthal orientation, it is possible on the one hand to assess the effect of the firing activity to be introduced on the target object and on the other hand the probability of collateral damage. In the case of a substantial difference between the effective and the specified typical accuracy value, this assessment may be incorrect.

Even with an electronic magnetic compass, considerable caution is still advisable in the determination of azimuthal orientations although the components of the magnetic and gravitational field are measurable as such with sufficient device accuracy. As disclosed in U.S. Pat. No. 4,949,089, the deviation of the Earth's magnetic field from geographic north can also be taken into account virtually automatically by means of the magnetic variation compensation implemented in military GPS receivers. Since, however, in addition to the Earth's magnetic field, the bearer of information relating to the north direction, the measured magnetic field as a rule includes stray magnetic fields superposed thereon, the azimuthal orientation relative to geographic north can nevertheless often only be determined with very limited accuracy and reliability, which may be several times the accuracy of the device itself.

These stray magnetic fields comprise stationary stray fields coordinated with the measuring location and stray fields which relate to the device itself and are due to electrical currents and magnetically hard and magnetically soft materials of the device in which the magnetic compass is installed. Stationary stray fields can moreover be divided into stray fields of regional scale and stray fields of local scale.

Stray fields of regional scale, so-called anomalies of the Earth's magnetic field, are as a rule due to natural interfering effects, for example extensive deposits of iron ore. When considered on a local scale, these stray fields are homogeneous and result locally in a constant azimuthal error compared with the deviation of the Earth's magnetic field.

On the other hand, stray fields of local scale are due to man-made objects, for example railway tracks, water pipes or overhead lines, pipelines or structures made of steel and reinforced concrete. Quasi-stationary objects, such as parked vehicles and weapons systems brought into position, also cause stray magnetic fields of local scale. When considered on a local scale, these stray fields are inhomogeneous and cause, even within measuring spaces, azimuthal errors which vary with dimensions of metres and may also vanish in some locations.

As disclosed in DE 196 09 762 C1, fixed stray fields of a device having an electronic magnetic compass which has sensors for the three-dimensional measurement of the components of a magnetic field and of a gravitational vector can be arithmetically compensated when determining azimuthal orientations of the device by means of a vector equation. The parameters of the vector equation must be determined beforehand by means of an optimization method. This optimization method is based on values of a more or less rigidly specified sequence of measurements of the components of the magnetic field and of the gravitational vector at a measuring location. In the case of each of these measurements, the device is oriented differently in space. In this way, however, stationary stray magnetic fields can be neither compensated nor detected at the measuring location.

U.S. Pat. No. 6,539,639 B2 discloses a method in which the accuracy in the determination of an azimuthal orientation using a magnetic compass is said to be monitorable. Since such a magnetic compass has sensors for the three-dimensional measurement of the components of the magnetic field and of the gravitational vector, the values of the horizontal and vertical field strength of the magnetic field are also obtained in the determination of an azimuthal orientation. The method is based here on a comparison of these values with stored values of the horizontal and vertical field strengths from the past in the light of the specified threshold value. The stored values of the horizontal and vertical field strengths may be attributable on the one hand to a determination of the parameters, comparable with DE 196 09 762 C1, at another measuring location or, on the other hand, be obtained by averaging horizontal and vertical field strengths of past determinations of the azimuthal orientation. Since, however, there is no direct relationship between a change in the horizontal and vertical field strengths between different measuring locations and the occurrence of azimuthal errors and, on the other hand, significant azimuthal errors may occur even in the case of similar horizontal and vertical field strengths at different measuring locations, false alarms occur again and again in the case of such monitoring or necessary warnings are not given. In addition, such a warning also only contains the information that differences of horizontal and/or vertical field strengths of a certain magnitude were determined over a certain period.

It is therefore an object of the invention to eliminate deficiencies of the prior art and to provide methods for estimating the accuracy of azimuthal orientations of a measuring device having an electronic magnetic compass, which methods have a greater reliability.

This object is achieved by a plurality of methods for estimating the accuracy of azimuthal orientations of a measuring device having the features hereinafter described. These methods are in each case specifically designed for different types of stray fields. By cause-related differentiations between the methods and by being based on additional information during measurement, precision and reliability in the estimation of the accuracy can be increased. In addition, this object is also achieved by a method for providing an azimuthal orientation and the estimated accuracy thereof by a portable sighting device hereinafter described. Further alternatives or advantageous developments and further developments of the invention also are described herein.

The measuring device used in the respective methods has the respective measuring components or sensors necessary for carrying out the respective method. In this way it is possible, for example, to determine azimuth and horizontal field strength of the magnetic field with two horizontally aligned magnet field sensors. For the measurement of the magnetic field strength, three magnetic field sensors are necessary. In order to determine the vertical field strength of a magnetic field and the angle of inclination, three—especially linearly independently arranged—magnetic field sensors and two or three sensors, such as for example tilt or acceleration sensors, for measuring of components of the gravitational vector are to be provided. For a person skilled in the art, these are obvious measures and findings which, therefore, are in the following not explained in detail for each method.

In a method according to the invention for estimating the accuracy of azimuthal orientations of a measuring device having an electronic magnetic compass, a plurality of determinations of an azimuthal orientation are carried out, in which the measuring device is aligned with one and the same measuring point at different measuring locations adjacent to one another. On the basis of these determined azimuthal orientations, a value of the accuracy is estimated automatically by the measuring device by means of a computational method. Advantageously, the adjacent measuring locations are present one on top of the other or along a straight line to the measuring point. By means of this method, stationary stray fields of local scale can be detected and the effects thereof on the accuracy can be estimated.

The estimation of the accuracy of the azimuthal orientations determined is effected by known methods for statistical calculation of fit; for example, a variation is determined from a plurality of determined azimuthal values $a_1, a_2, \ldots, a_n$. Thus, it is also possible to check whether the deviations are below a specified threshold value for the desired accuracy of the measurements, for example by means of $|a_{max} - a_{min}|<$threshold value, where $a_{max}$, $a_{min}$ denote the maximum and minimum value of the determined azimuths $a_1, a_2, \ldots, a_n$.

In a further method according to the invention for estimating the accuracy of azimuthal orientations of a measuring device, the measuring location thereof is known at least on a regional scale. In the determination of an azimuthal orientation, at least a field parameter of the magnetic field is additionally provided and is related to the corresponding field parameter of a model of the Earth's magnetic field, for example the IGRF model. On the basis of this, a value of the accuracy is estimated by the measuring device automatically by means of a computational method. By means of this method, stationary stray fields of regional scale can be detected and the effects thereof on the accuracy can be roughly estimated.

By means of the relationship $$\delta a = \arcsin(\delta b/b_{HE}) \approx \delta b/b_{HE},$$

where a . . . azimuth, b . . . measured field parameter of the magnetic field, $b_{HE}$ . . . actual horizontal field strength of the Earth's magnetic field, the error $\delta a$ can be estimated by determining an error $\delta b$ of the magnetic field. $\delta b$ represents a variation of a field parameter of the magnetic field, e.g. a deviation of the actual value from the setpoint value of field strength $b_E$, vertical field strength by or horizontal field strength $b_H$ of the Earth's magnetic field. The angle of inclination i, too, can be used for determining the azimuthal error (for example, the geometrically-derivable relationship $\delta a = \delta i \cdot b_E/b_H = \delta i/\cos(i)$) is applicable.

The actual value of the respective field parameter is provided by the measurement, and the setpoint value by a model—such as the IGRF model—of the Earth's magnetic field.

Once again, it is possible to check a condition $|\delta b| = |b_{ACTUAL} - b_{SETPOINT}| <$ threshold value.

(Remark: The relationships $\delta a = \arcsin(\delta b/b_{HE}) \approx \delta b/b_{HE}$, $\delta i = \delta i \cdot b_E/b_H = \delta i/\cos(i)$ are derived for the "worst case" assumption, i.e. measured difference and actual field parameter are normal to one another.)

In a further method according to the invention for estimating the accuracy of azimuthal orientations of a measuring device having a digital magnetic compass, the accuracy is established according to the accuracy of compensation in the arithmetic compensation of stray fields relating to the device itself. The accuracy of compensation is determined with the aid of a method for the statistical compensation calculation which is based on measured values of a sequence of measurements which is a requirement for the arithmetic compensation of stray fields relating to the device itself.

The measured magnetic field at the measuring location $b_{mea}$ is corrected on the basis of the method disclosed in DE 196 09 762—relevant equation (2): $\vec{b}_e = m(\vec{b}_{mea} - \vec{b}_s)$—the following being applicable:

$\vec{b}_e$ . . . actual Earth's magnetic field at the measuring location m . . . prop. magnetically soft field distortion $\vec{b}$ . . . measured magnetic field $\vec{b}_s$ . . . magnetically hard stray field vector.

The actual Earth's magnetic field $\vec{b}_e$ thus corresponds to the measured magnetic field corrected with respect to the stray field relating to the device itself $\vec{b}_{mea,corr}$ ($\vec{b}_{mea,corr} \equiv \vec{b}_e$). For the parameters m, $\vec{b}_s$ of equation (2) for correcting the measured field, the correlation matrix $c(m; \vec{b}_s)$ can be calculated by generally known methods for statistical calculation of fit. Furthermore, a correlation matrix $c(\vec{b}_e)$ can be determined for the corrected field $\vec{b}_e(\vec{b}_{mea,corr})$. With the matrix $c(\vec{b}_e)$ and the normalized gravitational vector $\tilde{g}$, ($\tilde{g} = \vec{g}/|\vec{g}|$), the components of the gravitational vector $\vec{g}$ being determined, for example by means of tilt or acceleration sensors, an error for the determination of the azimuthal orientation $\sigma_a(a, \tilde{g})$ can be calculated by known methods for statistical calculation of fit. Methods for the calculation of fit and for the determination of correlation matrices, etc., are described, for example, in "Numerical Recipes" (Press et al., Cambridge University Press 1998), Sections 14.1-14.5, or "Linear Algebra, Geodesy and GPS" (Strang G., Borre K., Wellesley-Cambridge Press) Chapter 9.

In a further method according to the invention for estimating the accuracy of azimuthal orientations of a measuring device, the accuracy of the arithmetic compensation of stray fields relating to the device itself is assessed. For this purpose, a plurality of control measurements is necessary at the same measuring location at which the measuring device is oriented in each case differently in space.

In this method according to the invention, for example the measuring device may be oriented several times azimuthally differently in space at the same measuring location, and the horizontal field strength $b_{H1}, \ldots, b_{Hn}$ measured at the respective azimuthal orientation (with different azimuthal angles $a_1, \ldots, a_n$) can additionally be considered as a field parameter of the magnetic field. In measurements at the same measuring location in the horizontal plane, with correct compensation of stray fields relating to the device itself, the same value for the horizontal field strength $b_{H1}, \ldots, b_{Hn}$ of the magnetic field must be measured in each case (within a certain variation). The measurement of different values of the horizontal field strengths $b_{H1}, \ldots, b_{Hn}$ with different azimuthal orientation of the measuring device at the same measuring location indicates stray fields relating to the device itself. If differences are found in the respective values of the horizontal field strengths $b_{H1}, \ldots, b_{Hn}$, it is once again possible to determine the maximum effect of the deviations on the accuracy of the azimuthal determination by means of $\delta a \approx \delta b / b_{HE}$. In measurements at the same measuring location, at the same azimuthal orientation—e.g. measurements in which the measuring device is oriented differently about its sighting axis or measurements to points on a perpendicular from the same measuring location—it is possible to draw conclusions about stray fields relating to the device itself and the accuracy of an azimuthal measurement directly from the azimuthal determination, which should give the same values $(a_1=a_2=\ldots=a_n)$ for all measurements. In measurements with the same azimuthal orientation, the products $b_H \cdot \sin a$, $b_H \cdot \cos a$, which correspond to the horizontal components of the magnetic field vector measured in the device system, can also be considered for assessing the accuracy of the measurements.

In a method according to the invention for providing azimuthal orientation of a portable sighting device and an estimated value of the accuracy thereof, in particular for a firing control post or a GIS, the value is estimated according to one of the preceding methods. A signal with information about an azimuthal orientation determined by the sighting device and the estimated value of the accuracy thereof is then provided at an interface of the measuring device.

A portable sighting device according to the invention has an electronic magnetic compass for determining azimuthal orientations of the sighting device and further sensors a distance away therefrom for measuring a magnetic field. In addition, an interface for providing a signal, in particular for a firing control post or a GIS, is provided, which signal comprises information about the azimuthal orientation and a value of the accuracy thereof. On the basis of the various measured data for magnetic compass and for the sensors a distance away, it would be possible to obtain from the sighting device information about the inhomogeneity of the magnetic field to be measured, for determining the expected accuracy.

Embodiments of the inventions are explained in more detail below purely by way of example on the basis of the drawings.

Figure 5:
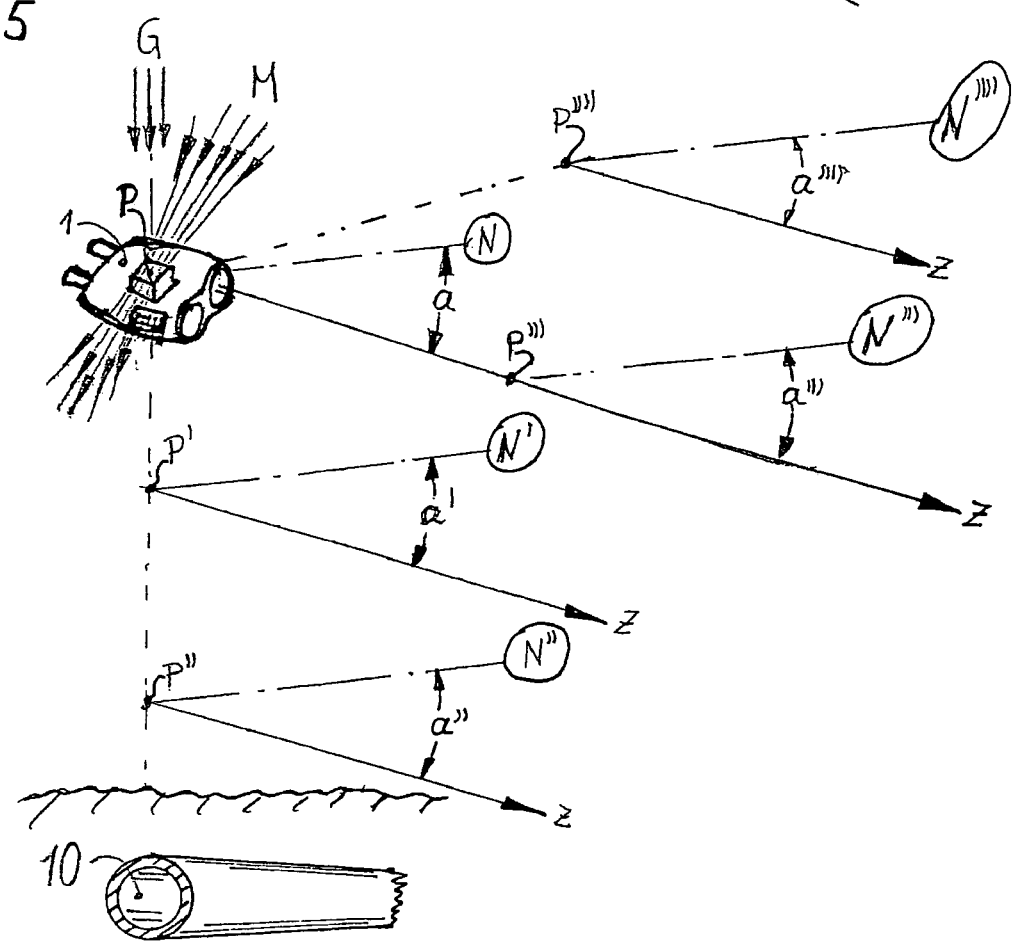

FIG. 1 schematically shows a measuring arrangement for determining target coordinates of a distant object by means of a measuring device having a magnetic compass on a tripod, FIG. 2 schematically shows a method according to the invention, in which the measuring device from FIG. 1 is differently azimuthally oriented three times, FIG. 3 schematically shows an alternative embodiment of the method from FIG. 2, in which the measuring device is tilted three times differently about its sighting axis, FIG. 4 schematically shows a further alternative embodiment of the method from FIG. 2, in which the measuring device is set up with different zenith orientation three times, FIG. 5 schematically shows further methods according to the invention, in which the measuring device is aligned with the same measuring point at a plurality of measuring locations adjacent to one another for measurements.

FIG. 1 shows a first measuring arrangement for determining target coordinates of a distant target object 5. The measuring arrangement has a measuring device 1 which is fixed on a tripod 9 of nonmagnetic material, a GPS receiver 4 and a transmission device 7. Here, the target object 5 is formed by a tracked vehicle which has taken up position next to a house 6.

A laser telemeter and digital magnetic compass 2 is integrated in the measuring device 1, which in this case is in the form of a sighting binocular having a sighting axis z. In contrast to the laser telemeter, the digital magnetic compass 2 is indicated by being drawn as a small cuboid within the binocular. The azimuthal orientation a of the measuring device 1 relative to a theoretical north N and the zenith orientation thereof relative to a perpendicular are determined by means of the digital magnetic compass 2, which in this case has three magnetic field sensors fixed to the device for the three-dimensional measurement of a magnetic field M and two tilt sensors for measuring the direction of the gravitational field G of the Earth.

In the case of the theoretical north N, the deviation—position-dependent on a regional scale—of the Earth's magnetic field from geographic north has to be taken into account. This can be effected virtually automatically in a manner known per se by transmitting a declination value specific for the respective region from the GPS receiver 4 to the measuring device 1.

In addition to taking account of the correct declination value, a correct compensation of stray fields relating to the device itself is a basic requirement for a correct determination of the azimuthal orientation, since stray fields relating to the device itself are present in the immediate vicinity of the magnetic compass 2, and those changes in the stray fields of the device itself which are not taken into account can therefore cause considerable azimuthal errors. Stray fields relating to the device itself are also taken into account here in the theoretical north N.

Since, in the case of this measuring arrangement, the stray fields relating to the device itself are correctly compensated and no stationary stray fields of local scale are present in the vicinity of the measuring device 1, a substantially homogeneous magnetic field M in which azimuthal orientations a relative to one another can be determined correctly without circular errors is present. This homogeneity is additionally increased by fixing the measuring device 1 on the tripod 9, since the magnetic compass 2 can be moved only within a very small measuring space of a few centimetres.

Stationary stray magnetic fields of regional scale which cause a constant azimuthal error can be detected and roughly estimated by means of one of the methods according to the invention for estimating the accuracy of azimuthal orientations a. In this method, at least one field parameter of the magnetic field M, in this case the magnetic inclination, is simultaneously provided by the digital magnetic compass 2 in a determination of an azimuthal orientation a. Since the measuring location in this case is known to the measuring device 1, for example via the GPS receiver 4, the measured magnetic inclination can be assessed automatically with the regional position-dependent magnetic inclination of a model of the Earth's magnetic field—in this case the IGRF model—in the light of a specified threshold value, and an accuracy of the azimuthal orientation a can be established.

If the difference between the magnetic inclination measured during the determination of the azimuthal orientation a and the magnetic inclination of the IGRF model is significant in comparison with the threshold value, a stationary stray magnetic field of regional extent is present. In this case, the estimation of the accuracy of the azimuthal orientation a should be adapted accordingly by the measuring device 1.

If, on the other hand, the difference is insignificant in comparison with the threshold value, no significant, stationary stray magnetic field of regional extent is likely to be present. Since in addition no stationary stray field of local scale is present here in the vicinity of the measuring device 1 and the deviation and the stray fields relating to the device itself are correctly taken into account, the accuracy of azimuthal orientations a can be established according to a compensation accuracy by a further method according to the invention. This results from the arithmetic compensation of stray fields relating to the device itself and represents a maximum limit for the achievable accuracy of azimuthal orientations a if stray fields relating to the device itself are present and these are compensated during the determination of azimuthal orientations a. In the case of the present measuring arrangement without stationary stray fields, the accuracy of azimuthal orientations a is determined to a good approximation by the compensation accuracy.

The arithmetic compensation of stray fields relating to the device itself is effected, according to DE 196 09 762 C1, by means of a vector equation whose parameters were determined by means of an optimization method. The optimization method is based on values of a specified sequence of measurements of the components of the magnetic field M and of the gravitational vector G, in which sequence the measuring device 1 is in each case oriented differently in space at a measuring location p. The compensation accuracy is estimated with the aid of a method for statistical compensation calculation, which method is based on the values of the sequence of measurements, taking into account the established parameters of the vector equation.

After the azimuthal orientation a of the measuring device 1 aligned with the target object 5 has been determined, a signal which, inter alia, comprises the determined azimuthal orientation a and the estimated accuracy thereof is provided at an interface 3 of the measuring device 1. The signal provided is transmitted to the GPS receiver 4, taken into account there in the calculation of the target coordinates and the estimated accuracy thereof and transmitted via the transmission device 7 to a firing control post which is not shown.

On the basis of the method according to the invention, implemented in the measuring device 1, for estimating the accuracy of the azimuthal orientation a, the accuracy can be estimated in a relatively reliable manner. Consequently, possible collateral damage to the house 6 can be recognized in good time in the event of firing activity planned in relation to the target coordinates.

FIG. 2 shows the measuring device 1 from FIG. 1, by means of which a further method according to the invention for estimating the accuracy of azimuthal orientations a is carried out. This method for estimating the accuracy of azimuthal orientations a is based on an assessment of the accuracy of the compensation of stray fields relating to the device itself and is possible, for example, for tripod-based measuring devices according to FIG. 1.

In this method, three control measurements of the components of the magnetic field M and possibly of the gravitational vector are carried out with the digital magnetic compass 2 at the same measuring location P. The measuring device 1 is oriented in each case azimuthally differently in space in a three-part cycle. In each control measurement, in each case at least one field parameter, for example the horizontal field strength here, is measured. Once the parameters of the vector equation for compensation of stray fields relating to the device itself have been correctly determined, the horizontal field strength in the control measurements must be substantially the same in each case, in particular independently of stationary stray fields of regional or local extent.

The differences between the respective horizontal field strengths contain information about a change in the stray fields relating to the device itself between the time of establishing the parameters and the control measurements. If these differences are also assessed in relation to the horizontal field strength at the measuring location, information about possible effects on a determination of the azimuthal orientation a is also obtainable. The quotient of the respective difference between different horizontal field strengths and the mean of the horizontal field strengths is a measure of the effects on a possible error of the azimuthal orientation a. The realized accuracy of compensation of stray fields relating to the device itself can thus be estimated. Thus, for example, the same difference between horizontal field strengths in Finland results in twice the azimuthal error as in Switzerland.

If the differences or the above-mentioned quotients are related to a specified threshold value, the estimated value of the accuracy must be correspondingly reduced when the threshold value is exceeded. Alternatively, the measuring device 1 can propose to the user to determine the parameters of the vector equation for the arithmetic compensation of stray magnetic fields relating to the device itself at the measuring location P via the specified sequence of measurements, for example as in DE 196 09 762 (or via a so-called twelve-point compensation).

Of course, by taking into account further field parameters of the magnetic field M, for example the vertical field strength or the ratio of horizontal field strength to vertical field strength, the quality of the estimation of the accuracy can be improved.

FIG. 3 shows an alternative embodiment of the method according to the invention for estimating the accuracy of azimuthal orientations a from FIG. 2, which is likewise based on an assessment of the accuracy of the compensation of stray fields of the measuring device 1 which relate to the device itself. This embodiment is possible primarily for hand-held measuring devices.

In contrast to the method from FIG. 2, the measuring device 1 in this embodiment is oriented so that its sighting axis z points to a fixed measuring point, in this case the house 6. In this embodiment, the measuring device 1 is tilted in each case differently about the sighting axis z in the three-part cycle in the three control measurements of the components of the magnetic field M and possibly of the gravitational vector G. Three control measurements are thus carried out with the digital magnetic compass 2 at the same measuring location P in which measurements the measuring device has the same azimuthal alignment with the house 6.

For example, in addition to the method from FIG. 2, the differences between the respective product of the horizontal field strength and the sine of the azimuthal orientation a and/or the product of the horizontal field strength and of the cosine of the azimuthal orientation a can thus be related to a further threshold value. On the basis of this additional measurement information, the effects on the accuracy in the determination of azimuthal orientations a can be even more reliably estimated.

FIG. 4 shows a modified embodiment of the method according to the invention for estimating the accuracy from FIG. 3, which method is likewise based on an assessment of the accuracy of the compensation of stray fields of the measuring device 1 which relate to the device itself.

In contrast to the method from FIG. 3, here the measuring device 1 is oriented differently in the three control measurements of components of the magnetic field M and possibly of the gravitational vector G, in each case such that the three differently inclined sighting axes z, z' and z" intersect the same perpendicular. This perpendicular can, as shown here, be embodied by an edge of a tower 8. Three control measurements are thus carried out with the digital magnetic compass 2, in which measurements the measuring device 1 has the same azimuthal orientation a towards the edge of the tower 8. This information can advantageously be taken into account in estimating the accuracy, comparably with the method of FIG. 3. It is also conceivable for the methods according to the invention of FIGS. 2 to 4 to be combined with one another.

FIG. 5 shows the measuring device 1 for FIGS. 1 to 4 over a buried cast iron pipe 10. Further methods according to the invention for estimating the accuracy of azimuthal orientations a, which are based on an assessment of the effects of stationary stray magnetic fields of local scale, are carried out by means of the measuring device 1.

In this method according to the invention, the measuring device 1 is aligned with its sighting axis z in each case with the same measuring point not shown here, for example the house 6 from FIG. 3, in a plurality of measurements at different measuring locations P, P' or P", P or P'" and P or P"" adjacent to one another. However, it would also be conceivable in this method, comparably with the control measurements of FIG. 4, to align the measuring device 1 with a perpendicular edge at different heights in each case, since the azimuthal orientation a for the measurements of these methods is also constant in this way.

These methods for estimating the accuracy of azimuthal orientations a are based on a direct check of azimuthal orientations a in the direct vicinity of the measuring location P. In contrast to the methods of FIG. 1, in these methods not only are field strength values of magnetic fields M related to one another but the magnitude of the azimuthal orientation a is directly determined, the accuracy of which orientation is automatically estimated by the measuring device 1 using the methods according to the invention.

Inhomogeneities of the magnetic field M caused by stationary stray fields of local scale, in this case by the cast iron pipe 10, can be detected by means of these methods and the effect on the determination of azimuthal orientations a can be roughly estimated. Stationary stray fields of regional scale or changes in the stray field relating to the device itself have no effect on these methods and cannot be detected by them.

It is advantageous if the target object whose azimuthal orientation is to be determined and the measuring point with which the sighting axis z is aligned in these methods have similar azimuthal orientations.

In a first embodiment of these methods for estimating the accuracy of azimuthal orientations a, for example, the measuring device 1 requires that the sighting axis z be aligned with, in each case, the same measuring point, at first measuring locations adjacent to one another, in the example first standing at the measuring location P, then kneeling at the first further measuring location P' and finally lying at the second further measuring location P". Since the magnetic field M within the large measuring space here, easily one and a half meters in size, is markedly inhomogeneous owing to the stray field caused by the cast iron pipe 10, the different measuring locations P, P' and P" have in each case different theoretical north directions N, N' and N", with the result that different azimuthal orientations a, a' and a" are determined in spite of the same measuring point. On the basis of these different azimuthal orientations a, a' and a", an accuracy for a determination of azimuthal orientations a at the measuring location P can be estimated by the measuring device 1 by means of a computational method.

The first embodiment of these methods is particularly suitable for buried stray fields, since the measurements in the decisive effective direction of buried stray fields are carried out hereby. Buried stray fields are also a significant source of errors in the determination of azimuthal orientations since, in contrast to stray magnetic fields on the surface, they generally cannot be perceived.

In a further embodiment of these methods according to the invention, measurement is effected at second measuring locations adjacent to one another; a third further measuring location P'" is sought after a measurement at the measuring location P by taking a step in the direction of the sighting axis z, and a second measurement is carried out there. Consequently, it is possible to obtain information about effects of the stray field of the cast iron pipe 10 in a further spatial dimension.

In a further embodiment, measurement is effected at third measuring locations adjacent to one another; a fourth further measuring location P"" is sought after the measurement at the measuring location P by taking a step perpendicularly to the sighting axis z, and the second measurement to the measuring point which is advantageously far away in this case is carried out. Information about effects of the stray field of the cast iron pipe 10 can thus also be obtained in the third spatial dimension.

The preceding embodiments of these methods can be combined with one another. Furthermore, the estimation of the accuracy of azimuthal orientations becomes more reliable and more accurate if, in addition to the information of the different azimuthal orientations determined at different measuring locations to the same measuring point, measured field parameters of the magnetic field M are taken into account. In particular, the product of the horizontal field strength and of the sine of the azimuthal orientation a and/or the product of the horizontal field strength and of the cosine of the azimuthal orientation a gives relevant information for estimating the accuracy. The reliability can also be further increased if stored field parameters from the past, for example from a calibration of the magnetic compass and its sensors in the factory, are taken into account.

We claim:

1. Method for estimating the accuracy of azimuthal orientations of a measuring device, in which
   the azimuthal orientations are determined by measuring components of a magnetic field by means of an electronic magnetic compass and
   a value of the accuracy is automatically estimated by means of a computational method which is based on a plurality of determinations of an azimuthal orientation, in which the measuring device is aligned with the same measuring point at different measuring locations adjacent to one another.

2. Method for estimating the accuracy according to claim 1, wherein
the magnetic compass has sensors for measuring the horizontal field strength of the magnetic field and
the computational method is additionally based in each case on the product of the measured horizontal field strength and of the sine of the determined azimuthal orientation and/or the product of the measured horizontal field strength and the cosine of the determined azimuthal orientation.

3. Method for estimating the accuracy according to claim 2, wherein
the magnetic compass has sensors for the, measurement of the components of the magnetic field and means for measuring components of a gravitational vector and
the computational method is additionally based in each case on the measured vertical field strength of the magnetic field.

4. Method for estimating the accuracy according to any of claims 1 to 3, wherein the different measuring locations are arranged substantially perpendicularly.

5. Method for estimating the accuracy according to any of claims 1 to 3, wherein the different measuring locations are arranged substantially on a straight line through the measuring point.

6. Method for estimating the accuracy according to any of claims 1 to 3, wherein the different measuring locations are substantially normal to a sighting axis and the measuring point is remote.

7. Method for estimating the accuracy of azimuthal orientations of a measuring device, the location of which is known on a regional scale, in which
the azimuthal orientations are determined by means of an electronic magnetic compass which has sensors for a three-dimensional, measurement of components of a magnetic field, and
a value of the accuracy is automatically estimated by means of a computational method, in which, as a function of the measuring location, at least one field parameter of a model of the Earth's magnetic field is related to at least one determined value of the magnetic field coordinated with the field parameter.

8. Method for estimating the accuracy according to claim 7, wherein said one field parameter is the magnetic field strength and/or the magnetic inclination.

9. Method for estimating the accuracy according to claim 7, wherein the electronic magnetic compass additionally has sensors for a measurement of components of a gravitational vector.

10. Method for estimating the accuracy of azimuthal orientations of a measuring device, in which
the azimuthal orientations are determined by means of an electronic magnetic compass which has sensors arranged in a fixed manner in relation to the device for three-dimensional measurement of components of a magnetic field,
in a determination of azimuthal orientations stray magnetic fields relating to the device itself are arithmetically compensated by means of a vector equation whose parameters were determined by means of an optimization method which is based on values of a specified sequence of measurements of components of the magnetic field in which sequence the measuring device is in each case oriented differently in space, and
a value of the accuracy of azimuthal orientations is automatically estimated by means of a statistical compensation calculation, which calculation is based on the values of the sequence of measurements, taking into account the parameters of the vector equation.

11. Method for estimating the accuracy according to claim 10, in which
a plurality of control measurements of the components of the magnetic field are carried out at the same measuring location, in which control measurements the measuring device is oriented in each case differently in space,
the differences between determined values of the magnetic field being coordinated with at least one field parameter related to a specified threshold value and
when the threshold value is exceeded, the value of the accuracy is correspondingly adapted or the parameters of the vector equation for the arithmetic compensation of the stray magnetic fields relating to the device itself are determined again by means of the specified sequence of measurements.

12. Method for estimating the accuracy according to claim 11, in which the differences between the respective product of the horizontal field strength and of the sine of the azimuthal orientation and/or the product of the horizontal field strength and of the cosine of the azimuthal orientation are additionally related to a further threshold value.

13. Method for estimating the accuracy according to claim 11, wherein the measuring device is in each case differently azimuthally oriented in the control measurements.

14. Method for estimating the accuracy according to claim 11 or 12, wherein the measuring device is in each case oriented identically with respect to azimuth and differently with respect to zenith in the control measurements.

15. Method for estimating the accuracy according to claim 11 or 12, wherein the measuring device is in each case tilted identically with respect to azimuth and differently about the sighting axis of the measuring device in the control measurements.

16. Method for estimating the accuracy according to claim 11, wherein
the electronic magnetic compass additionally has sensors arranged in a fixed manner in relation to the device for a measurement of components of a gravitational vector and
the optimization method is also based on values of a specified sequence of measurements of components of the gravitational vector.

17. Method for estimating the accuracy according to claim 12, in which
a plurality of control measurements of the components of the magnetic field and of the gravitational vector are carried out at one measuring location, in which control measurements the measuring device is oriented in each case differently in space,
the differences between determined values of the magnetic field being coordinated with at least one field parameter related to a specified threshold value and
when the threshold value is exceeded, the value of the accuracy is correspondingly adapted or the parameters of the vector equation for the arithmetic compensation of the stray magnetic fields relating to the device itself are determined again by means of the specified sequence of measurements.

18. Method for providing an azimuthal orientation of a portable sighting device and n estimated value of the accuracy thereof, in which
    the value is estimated by means of a method according to any one of claims 1, 7, or 10 and
    a signal with information about an azimuthal orientation and the estimated value is provided at an interface of the measuring device.

19. Portable sighting device comprising
    an electronic magnetic compass for determining azimuthal orientations of such sighting device and
    an interface for providing a signal including information about the azimuthal orientation and a value of the accuracy thereof,
characterized in that
    means for estimating the value of the accuracy of the azimuthal orientation determined by the magnetic compass, said means including sensors for measuring the magnetic field coordinated remote from the magnetic compass.

* * * * *